(12) United States Patent
Weiler et al.

(10) Patent No.: US 11,572,663 B2
(45) Date of Patent: Feb. 7, 2023

(54) FACILITATING A SCREED ASSEMBLY IN LAYING A PAVING MATERIAL MAT WITH A UNIFORM FINISH

(71) Applicant: Caterpillar Paving Products Inc., Brooklyn Park, MN (US)

(72) Inventors: Patrick J. Weiler, Pella, IA (US); Kevin M. Adams, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 411 days.

(21) Appl. No.: 16/831,159

(22) Filed: Mar. 26, 2020

(65) Prior Publication Data

US 2021/0301479 A1 Sep. 30, 2021

(51) Int. Cl.
| | | |
|---|---|---|
| G06K 9/00 | (2022.01) | |
| E01C 23/01 | (2006.01) | |
| E01C 19/48 | (2006.01) | |
| G06N 20/00 | (2019.01) | |
| G06T 7/41 | (2017.01) | |
| G06Q 10/06 | (2012.01) | |

(52) U.S. Cl.
CPC .......... *E01C 23/01* (2013.01); *E01C 19/4873* (2013.01); *G06N 20/00* (2019.01); *G06Q 10/0637* (2013.01); *G06T 7/41* (2017.01); *E01C 2301/00* (2013.01); *G06T 2207/20081* (2013.01); *G06T 2207/30132* (2013.01)

(58) Field of Classification Search
CPC . G06T 2207/20081; G06T 2207/30132; G06T 7/41; G06T 7/40
See application file for complete search history.

(56) References Cited

U.S. PATENT DOCUMENTS

| | | | | |
|---|---|---|---|---|
| 5,484,227 A * | 1/1996 | Ikeda | ..................... | E01C 19/006 404/84.1 |
| 6,749,364 B1 * | 6/2004 | Baker | ................... | E01C 19/288 404/118 |
| 7,845,878 B1 * | 12/2010 | Godbersen | .............. | E01C 23/07 404/93 |
| 7,850,395 B1 * | 12/2010 | Brenner | ................. | G01B 21/30 404/75 |
| 7,946,787 B2 | 5/2011 | Glee et al. | | |
| 8,682,622 B1 * | 3/2014 | Brenner | ................... | G01C 7/04 703/2 |
| 9,394,653 B2 * | 7/2016 | Rutz | ....................... | G01J 5/025 |
| 10,458,076 B2 | 10/2019 | Marsolek et al. | | |
| 2009/0324331 A1 * | 12/2009 | Glee | ....................... | E01C 23/07 404/75 |
| 2012/0263366 A1 * | 10/2012 | Huo | ........................ | G06T 5/009 382/132 |

(Continued)

*Primary Examiner* — Avinash Yentrapati

(57) ABSTRACT

A control device may obtain sensing data related to a paving material mat region laid by a screed assembly of a road paver. The control device may determine, based on the sensing data, a respective texture value and/or a respective height value associated with each portion of two or more portions of the paving material mat region. The control device may determine, based on the respective texture values and/or the respective height values of the paving material mat region, a finish value associated with the paving material mat region. The control device may cause, based on the finish value of the paving material mat region, one or more actions to be performed.

18 Claims, 4 Drawing Sheets

(56) References Cited

U.S. PATENT DOCUMENTS

| | | | |
|---|---|---|---|
| 2014/0188350 A1* | 7/2014 | Popham | B60W 10/20 |
| | | | 701/49 |
| 2016/0060819 A1* | 3/2016 | Oetken | E01C 19/23 |
| | | | 404/72 |
| 2017/0236011 A1* | 8/2017 | Lakehal-Ayat | H04N 7/18 |
| | | | 382/159 |
| 2018/0030672 A1* | 2/2018 | Marsolek | E01C 19/42 |
| 2018/0276832 A1* | 9/2018 | Aikin | H04N 5/2256 |
| 2019/0078275 A1* | 3/2019 | Shelstad | E01C 23/01 |
| 2022/0180643 A1* | 6/2022 | Retterath | G01C 21/3867 |

* cited by examiner

US 11,572,663 B2

FACILITATING A SCREED ASSEMBLY IN LAYING A PAVING MATERIAL MAT WITH A UNIFORM FINISH

TECHNICAL FIELD

The present disclosure relates generally to facilitating a screed assembly of a road paver in laying a paving material mat and to automatically adjusting one or more settings associated with the screed assembly and/or the road paver to facilitate the screed assembly in laying a paving material mat with a uniform finish (a paving material mat with a uniform texture, a uniform height, a uniform density, and/or the like).

BACKGROUND

Paving machines (also referred to as road pavers) are commonly used to apply, spread, and/or compact a paving material mat (e.g., a mat of bituminous roadway material) relatively evenly over a work surface. These machines are generally used in the construction of roads, parking lots and other areas. A typical paving machine employs a screed assembly (sometimes referred to as a floating screed) to lay the paving material mat. The screed assembly may include one or more sections (e.g., a fixed section and/or one or more extendable sections attached to an end of the fixed section). Each section may be involved in laying a paving material mat.

Often, however, the paving material mat may not be uniform (e.g., the paving material mat may not have a uniform texture, a uniform height, a uniform density, and/or the like) when laid by the screed assembly. For example, a portion of the paving material mat may have a different texture, a different height, a different density, and/or the like than another portion of the paving material mat. This may be due to differences in respective configuration settings associated with each section of the screed assembly. Often, an operator may have difficulty recognizing when the paving material mat is nonuniform and/or how to adjust one or more settings associated with the screed assembly to cause the screed assembly to lay a uniform paving material mat.

One attempt to control a quality of a paving material distributed along a paving area using a paver is disclosed in U.S. Patent Application Publication No. 2019/0078275 ("the '275 publication") to Shelstad et al., published on Mar. 14, 2019. In particular, the '275 publication discloses using a thermal profile camera or an asphalt temperature scanner to record at least one thermal profile of a portion of a paving area and using an apparatus to analyze the at least one thermal profile in order to detect segregated spots of the paving material within the portion of the paving area. The '275 publication discloses that potential causes of segregation can be identified by the apparatus and automatic communication of possible solutions to the paving crew can be given.

While the apparatus of the '275 publication may be effective at analyzing thermal properties of a portion of a paving area to identify segregated spots, the '275 publication does not disclose analyzing and/or determining a uniformity of a finish of the portion of the paving area. Further, the '275 publication does not disclose automatically adjusting a setting associated with the paver to change the finish of the portion of the paving area. The system of the present disclosure solves one or more of the problems set forth above and/or other problems in the art.

SUMMARY

According to some implementations, a method may include obtaining sensing data related to a paving material mat region laid by a screed assembly of a road paver; determining, based on the sensing data, a respective texture value associated with each portion of two or more portions of the paving material mat region; determining, based on the sensing data, a respective height value associated with each portion of the two or more portions of the paving material mat region; determining, based on the respective texture values of the two or more portions of the paving material mat region and the respective height values of the two or more portions of the paving material mat region, a finish value associated with the paving material mat region; determining that the finish value associated with the paving material mat region indicates a nonuniform finish of the paving material mat region; and selectively adjusting, based on determining that the finish value associated with the paving material mat region indicates a nonuniform finish of the paving material mat region, one or more settings associated with the screed assembly or the road paver to cause the screed assembly to lay an additional paving material mat region that has a finish value that indicates a uniform finish.

According to some implementations, a control system for a screed assembly of a road paver may comprise at least one sensing device configured to capture sensing data concerning two or more portions of a paving material mat region laid by the screed assembly of the road paver; and a controller configured to: obtain the sensing data from the at least one sensing device; determine, based on the sensing data, a respective texture value of each portion of the two or more portions of the paving material mat region or a respective height value of each portion of the two or more portions of the paving material mat region; determine, based on the respective texture values of the two or more portions of the paving material mat region or the respective height values of the two or more portions of the paving material mat region, a finish value of the paving material mat region; and cause, based on the finish value of the paving material mat region, one or more actions to be performed.

According to some implementations, a work machine may comprise a screed assembly configured to lay a paving material mat; at least one sensing device configured to capture sensing data related to a paving material mat region; and a controller configured to: obtain the sensing data from the at least one sensing device; determine, based on the sensing data, a finish value of the paving material mat region; and cause, based on the finish value of the paving material mat region, one or more actions to be performed.

DETAILED DESCRIPTION

Figure 1:
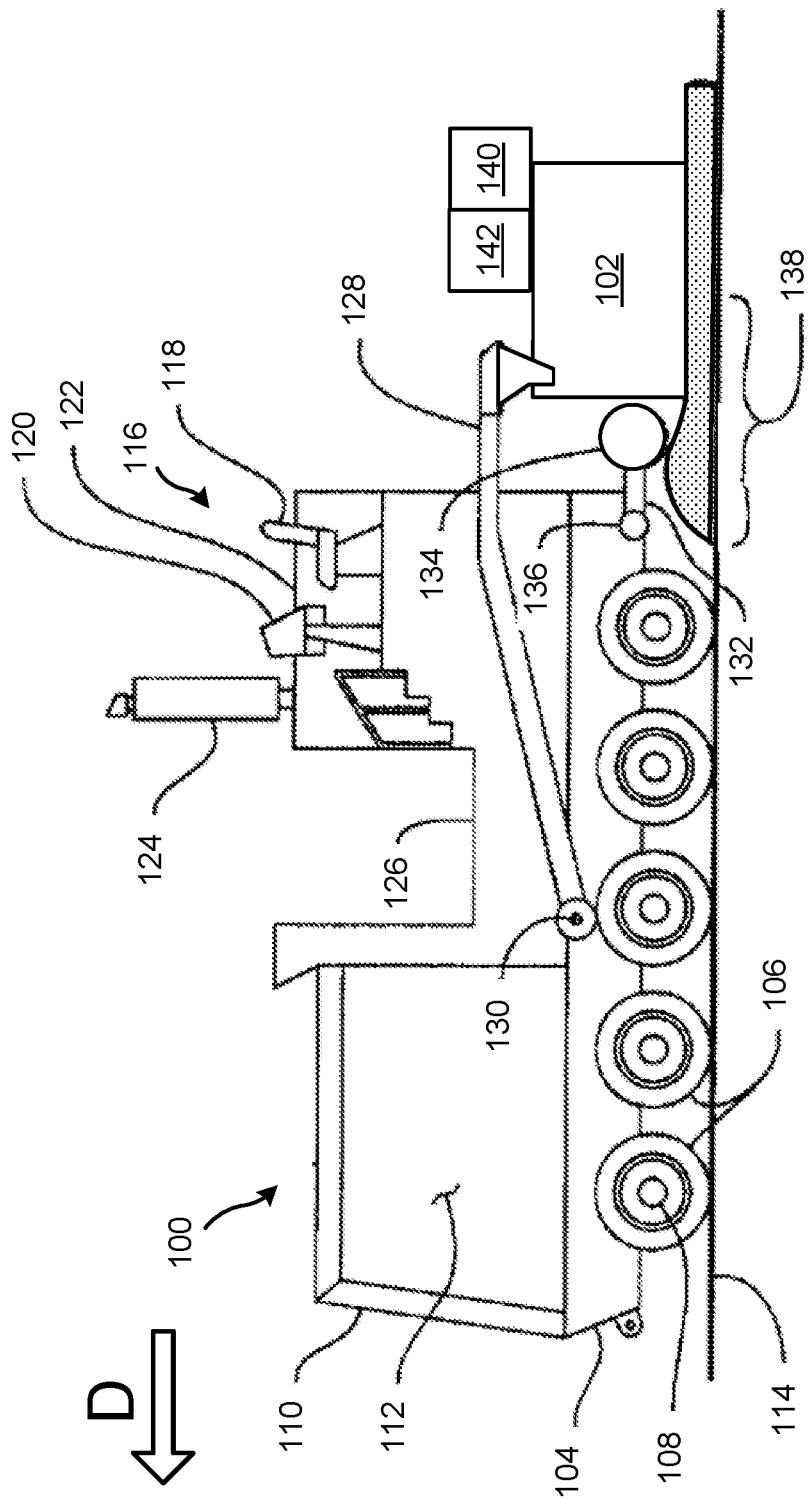
FIG. 1 is a diagram of an example machine described herein.

FIG. 1 is a diagram of an example machine 100 described herein. The term "machine" or "work machine" may refer to any machine that performs an operation associated with an industry such as, for example, paving, mining, construction, farming, transportation, or any other industry. For example, the machine 100 may include a mobile machine, such as a paving machine (e.g., a road paver, an asphalt finisher, and/or the like) shown in FIG. 1, or any other type of mobile machine.

As shown in FIG. 1, the machine 100 includes a screed assembly 102. Machine 100 includes a frame 104 that is supported by and transported upon a plurality of transport wheels 106 oppositely disposed on axles 108 that extend underneath frame 104 (e.g., transverse to a direction D of travel or motion of the machine 100 as shown in FIG. 1). A hopper 110 may be disposed on a forward portion of frame 104. Hopper 110 may include sides 112 extending vertically from frame 104 so that hopper 110 can receive material (e.g., bituminous aggregate material, such as asphalt) from a transport vehicle (e.g., a dump truck), and retain the material in hopper 110 pending disposition of the material on a surface 114 to be paved by machine 100.

As shown, towards a rear of the frame 104, an operator station 116 may be provided so that an operator, seated in a chair 118, can control operation of the machine 100, the screed assembly 102, and/or other components of the machine 100 by way of controls provided on a control panel 120. The control panel 120 may also include a display (e.g., a monitor) to display information and/or messages concerning the machine 100, the screed assembly 102, and/or other components of the machine 100.

Also disposed toward the rear of the frame 104 may be an engine housing 122, on which is provided an exhaust stack 124 for exhausting combustion by-products of engine housing 122. As further shown in FIG. 1, a walkway area 126 may be provided to permit access by personnel (e.g., the operator, members of a paving crew, and/or the like) to machine 100.

As further shown in FIG. 1, the screed assembly 102 may be connected to frame 104 by a set of screed support arms 128. In some cases, the set of screed support arms 128 may be substantially parallel and horizontal to one another, extending along frame 104, and be pivotally connected to frame 104 by an arm pivot 130, which may include a horizontal axis (e.g., which, as shown in FIG. 1, is transverse to the direction D of travel of the machine 100), thus permitting vertical movement of screed assembly 102.

As further shown, the machine 100 may further include an aggregate disposition apparatus 132. Aggregate disposition apparatus 132 may include at least one auger 134 (e.g., at least one flighted auger) disposed adjacent a rear of frame 104. As further shown, an auger support member 136 may be arranged for controlling a position of aggregate disposition apparatus 132. As an example, an auger 134 may include a flighted auger that provides at least two oppositely directed flights of paving material 138 from a centerline of the machine 100, for directing a substantially equal amount of paving material 138 towards outer edges of the screed assembly 102.

The screed assembly 102 may be configured to lay a paving material mat (e.g., paving material mat 202 further described in FIG. 2) by applying, spreading, and/or compacting the paving material 138 on the surface 114. The screed assembly 102 may include one or more sections (e.g., a fixed section and/or one or more extendable sections respectively attached to an end of the fixed section). Each section may include a screed plate and/or another component to facilitate laying of the paving material mat. An angle of attack (e.g., an angle the screed plate and/or the other component makes with the surface 114), a height (e.g., a height that the screed plate and/or the other component is away from the surface 114), and/or the like of the screed plate and/or the other component of the section may be configured by one or more settings associated with the section.

One or more settings may be associated with each section, such as a setting associated with an angle of attack, a height, and/or the like of the screed plate and/or other component of the section.

As further shown in FIG. 1, the machine 100 may further include at least one sensing device 140 disposed on or near the screed assembly 102. The at least one sensing device 140 is further described herein in connection with FIG. 2. The at least one sensing device 140 may be operably connected to the screed assembly 102, the control panel 120, and/or a control device 142. The control device 142 is further described herein in connection with FIG. 3.

As indicated above, FIG. 1 is provided as an example. Other examples may differ from what is described in connection with FIG. 1.

Figure 2:
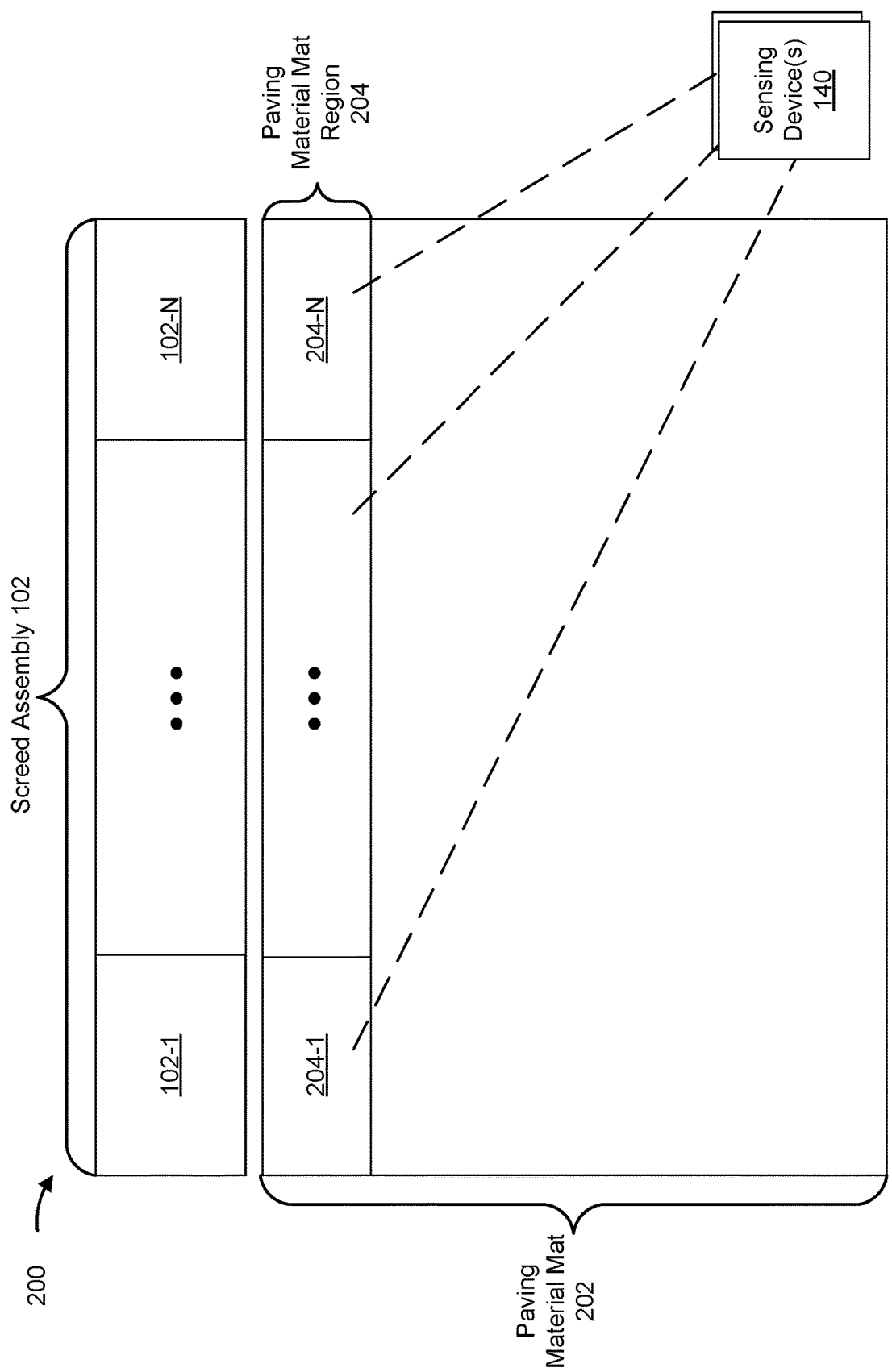
FIG. 2 is a diagram of an example paving material mat described herein.

FIG. 2 is a diagram 200 illustrating an example paving material mat 202 laid by screed assembly 102. As shown in FIG. 2, the paving material mat 202 may include a paving material mat region 204 that has just been laid by the screed assembly 102 (e.g., a section of the paving material mat 202 that has been laid by the screed assembly 102 during a particular time interval, such as within the last second, the last 10 seconds, the last 20 seconds, and/or the like) and that is monitored by the at least one sensing device 140. The paving material mat region 204 may include two or more portions (e.g., shown as portions 204-1 through 204-N, where N is greater than or equal to 2, of the paving material mat region 204). In some implementations, each portion, of the two or more portions, of the paving material mat region 204 may be respectively associated with a section of the two or more sections of the screed assembly 102 (e.g., shown as sections 102-1 through 102-N, where N is greater than or equal to 2, of the screed assembly 102). For example, a particular section of the screed assembly 102 may produce a particular portion of the paving material mat region 204.

The at least one sensing device 140 includes any type of sensor configured to capture sensing data (e.g., image data, distance data, and/or the like) related to the paving material mat region 204. The at least one sensing device 140 may include at least one camera device, at least one light detection and ranging (LIDAR) device, and/or the like to capture the image data, the distance data, and/or the like that comprises the sensing data.

For example, the at least one sensing device 140 may include a single camera device configured to capture image data (e.g., one or more images of each portion), distance data (e.g., one or more distances from the single camera device to each portion), and/or the like related to each portion, of the two or more portions (e.g., 204-1 through 204-N), of the paving material mat region 204 (e.g., each portion of the paving material mat region 204 is in a field of view of the single camera device). As another example, the at least one sensing device 140 may include a plurality of camera devices, where each camera device is configured to capture image data, distance data, and/or the like related to a respective portion, of the two or more portions, of the paving material mat region 204 (e.g., each portion of the paving material mat region 204 is in a field of view of a respective camera device of the plurality of camera devices). In another example, the at least one sensing device 140 may include a plurality of LIDAR devices, where each LIDAR device is configured to capture distance data related to a particular set of portions, of the two or more portions, of the paving material mat region 204 (e.g., each LIDAR device is targeted toward a particular set of portions of the paving material mat region 204). Other examples that include one or more camera devices, one or more LIDAR devices, and/or the like collecting sensing data are contemplated.

The at least one sensing device 140 may be configured to send the sensing data (e.g., directly or via one or more other components or devices of the machine 100) to the control device 142. The at least one sensing device 140 may send the sensing data (e.g., as a data stream, as a signal, and/or the like) to the control device 142 as the at least one sensing device 140 collects the sensing data.

As indicated above, FIG. 2 is provided as an example. Other examples may differ from what is described in connection with FIG. 2.

Figure 3:
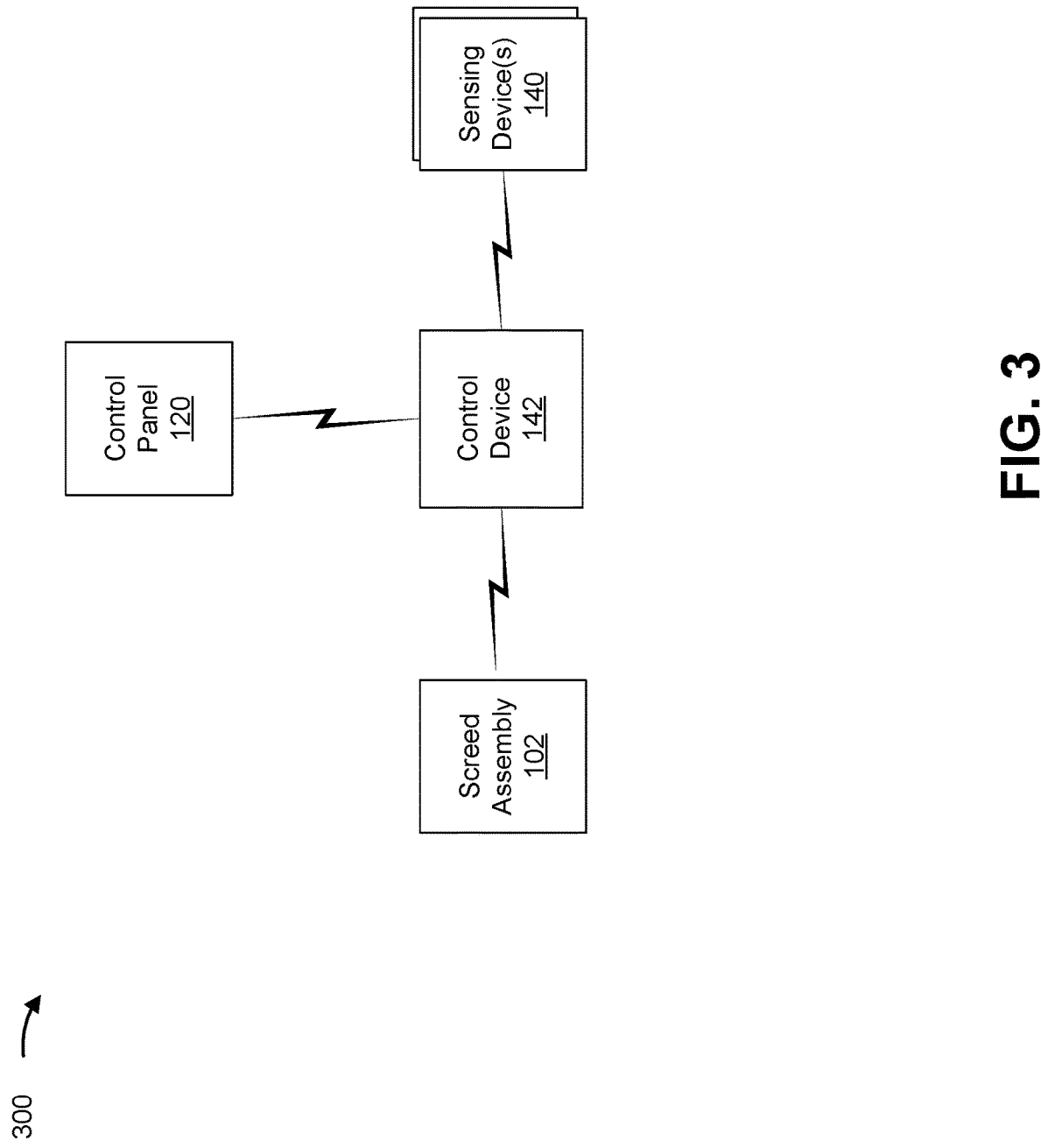
FIG. 3 is a diagram of an example environment described herein.

FIG. 3 is a diagram of an example environment 300 in which systems and/or methods described herein may be implemented. As shown in FIG. 3, environment 300 includes the screed assembly 102, the control panel 120, the at least one sensing device 140, and/or the control device 142. Devices of environment 300 may interconnect via wired connections, wireless connections, or a combination of wired and wireless connections.

The control device 142 may be a controller, an electronic control unit (ECU), and/or the like of the machine 100. The control device 142 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be implemented in hardware, firmware, and/or a combination of hardware and software. The control device 142 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the control device 142. The control device 142 may include a memory (e.g., a non-transitory computer-readable medium) capable of storing instructions that, when executed, cause the processor to perform one or more processes and/or methods described herein. The control device 142 may be configured to generate one or more commands to adjust one or more settings associated with the screed assembly 102 and/or the machine 100.

In some implementations, the control device 142 may receive the sensing data (e.g., related to the paving material mat region 204) from the at least one sensing device 140. The control device 142 may parse the sensing data to identify the image data, the distance, and/or the like that comprises the sensing data. Additionally, or alternatively, the control device 142 may separately receive the image data, the distance data, and/or the like that comprises the sensing data from the at least one sensing device 140.

The control device 142 may process the sensing data (e.g., that comprises the image data, the distance data, and/or the like) to determine a respective texture value associated with each portion of the two or more portions (e.g., portions 204-1 through 204-N) of the paving material mat region 204. A texture value associated with a portion of the paving material mat region 204 may indicate a texture of the portion (e.g., a roughness of the portion; a bumpiness of the portion, a reflectivity of the portion; a luminance of the portion; a pattern, such as size, orientation, directionality, and/or the like of composition components of the portion, and/or the like). For example, a texture value may range from 0 to 1, where a low texture value (e.g., greater than or equal to 0 and less than 0.3) indicates a smooth texture (e.g., the portion has little to no roughness and/or bumpiness, has high amounts of reflectivity and/or luminance, has a consistent pattern of composition components, and/or the like), a moderate texture value (e.g., greater than or equal to 0.3 and less than 0.7) indicates a rough texture (e.g., the portion has some roughness and/or bumpiness, has moderate amounts of reflectivity and/or luminance, has a moderately consistent pattern of composition components, and/or the like), and a high texture value (e.g., greater than or equal to 0.7 and less than or equal to 1) indicates a segregated texture (e.g., the portion has high amounts of roughness and/or bumpiness, has low amounts of reflectivity and/or luminance, has no consistent pattern of composition components, and/or the like), and/or the like.

To determine a texture value of a particular portion of the two or more portions of the paving material mat region 204, the control device 142 may process and/or analyze the sensing data to identify at least one subset of the sensing data (e.g., particular image data of the image data, particular distance data of the distance data, and/or the like) that is associated with the particular portion. The control device 142 may process and/or analyze the at least one subset of the sensing data using a statistical processing technique (e.g., a statistical image processing technique) to determine the texture value of the particular portion.

In some implementations, the control device 142 may utilize one or more models (e.g., one or more machine learning models) to process and/or analyze the at least one subset of the sensing data (e.g., to determine the texture value associated with the particular portion). The control device 142 may train a model (e.g., one of the one or more models, each of the one or more models, and/or the like) based on historical data (e.g., historical sensing data). The control device 142 may separate the historical data into a training set, a validation set, a test set, and/or the like. The training set may be utilized to train the model. The validation set may be utilized to validate results of the trained model. The test set may be utilized to test operation of the model.

In some implementations, the control device 142 may train the model using, for example, an unsupervised training procedure and based on the historical data. For example, the control device 142 may perform dimensionality reduction to reduce the historical data to a minimum feature set, thereby reducing resources (e.g., processing resources, memory resources, and/or the like) to train the model, and may apply a classification technique to the minimum feature set.

In some implementations, the control device 142 may use a logistic regression classification technique to determine a categorical outcome. Additionally, or alternatively, the control device 142 may use a naïve Bayesian classifier technique. In this case, the control device 142 may perform binary recursive partitioning to split the historical data into partitions and/or branches and use the partitions and/or branches to determine outcomes. Based on using recursive partitioning, the control device 142 may reduce utilization of computing resources relative to manual, linear sorting and analysis of data points, thereby enabling use of thousands, millions, or billions of data points to train the model, which may result in a more accurate model than using fewer data points.

Additionally, or alternatively, the control device 142 may use a support vector machine (SVM) classifier technique to generate a non-linear boundary between data points in the training set. In this case, the non-linear boundary is used to classify test data into a particular class.

Additionally, or alternatively, the control device 142 may train the model using a supervised training procedure that includes receiving input to the model from a subject matter expert, which may reduce an amount of time, an amount of processing resources, and/or the like to train the model relative to an unsupervised training procedure. The control device 142 may use one or more other model training techniques, such as a neural network technique, a latent semantic indexing technique, and/or the like. For example, the control device 142 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained model generated by the control device 142 by being more robust to noisy, imprecise, or incomplete data, and by enabling the control device 142 to detect patterns and/or trends undetectable to human analysts or systems using less complex techniques.

In some implementations, rather than training the model, the control device 142 may receive a trained model from another device (e.g., a client device or a server device). For example, the other device may generate the model based on having trained the model in a manner similar to that described above, and may provide the trained model to the control device 142 (e.g., may pre-load the control device 142 with the trained model, may receive a request from the control device 142 for the trained model, and/or the like).

In some implementations, the control device 142 may process the sensing data (e.g., that comprises the image data, the distance data, and/or the like) to determine a respective height value associated with each portion of the two or more portions (e.g., portions 204-1 through 204-N) of the paving material mat region 204. A height value associated with a portion of the paving material mat region 204 may indicate a representative height (e.g., in centimeters, inches, and/or the like) of the portion. For example, the height value may be a mean height, a median height, a maximum height, a minimum height, and/or the like of the portion (e.g., measured from the surface 114 to a top layer of the portion of the paving material mat region 204, from a top layer of the portion of the paving material mat region 204 to a component on the machine 100, such as the at least one sensing device 140, and/or the like).

To determine a height value of a particular portion of the two or more portions of the paving material mat region 204, the control device 142 may process and/or analyze the sensing data to identify at least one subset of the sensing data (e.g., particular image data of the image data, particular distance data of the distance data, and/or the like) that is associated with the particular portion. The control device 142 may process and/or analyze the at least one subset of the sensing data to determine the height value of the particular portion. For example, the control device 142 may identify one or more distances indicated by the at least one subset of the sensing data and determine (e.g., using one or more processing techniques based on geometric principles) one or more height measurements associated with the particular portion. The control device 142 determine the height value of the particular portion based on the one or more height measurements (e.g., determine an average of the one or more height measurements, a maximum height measurement, a minimum height measurement, and/or the like).

The control device 142 may determine a finish value associated with the paving material mat region 204 (e.g., based on the respective texture values of the two or more portions of the paving material mat region 204 and/or the respective height values of the two or more portions of the paving material mat region 204). The finish value may indicate a finish of the paving material mat region 204 across the two or more portions of the paving material mat region 204. For example, the finish value may range from 0 to 1, where a low finish value (e.g., greater than or equal to 0 and less than 0.3) indicates a more uniform finish (e.g., in terms of texture, height, and/or the like), a moderate finish value (e.g., greater than or equal to 0.3 and less than 0.7) indicates a moderately uniform finish (e.g., in terms of texture, height, and/or the like), and a high finish value (e.g., greater than or equal to 0.7 and less than or equal to 1) indicates a nonuniform finish (e.g., in terms of texture, height, and/or the like), and/or the like.

The paving material mat region 204 may have a more uniform finish when the respective texture values of the two or more portions are similar and/or the respective height values of the two or more portions are similar. The paving material mat region 204 may have a nonuniform finish when the respective texture values of the two or more portions are not similar and/or the respective height values of the two or more portions are not similar.

For example, the control device 142 may determine a difference between a respective texture value of a first portion, of the two or more portions, of the paving material mat region 204 and a respective texture value of a second portion, of the two or more portions, of the paving material mat region 204. When the difference satisfies (e.g., is less than or equal to) a threshold, the control device 142 may assign a finish value that indicates a uniform finish (e.g., a more uniform finish, a moderately uniform finish, and/or the like) of the paving material mat region 204. When the difference does not satisfy (e.g., is greater than) the threshold, the control device 142 may assign a finish value that indicates a nonuniform finish of the paving material mat region 204.

As another example, the control device 142 may determine a difference between a respective height value of a first portion, of the two or more portions, of the paving material mat region 204 and a respective height value of a second portion, of the two or more portions, of the paving material mat region 204. When the difference satisfies (e.g., is less than or equal to) a threshold, the control device 142 may assign a finish value that indicates a uniform finish (e.g., a more uniform finish, a moderately uniform finish, and/or the like) of the paving material mat region 204. When the difference does not satisfy (e.g., is greater than) the threshold, the control device 142 may assign a finish value that indicates a nonuniform finish of the paving material mat region 204.

In an additional example, the control device 142 may determine, based on the respective texture values and/or the respective height values of the two or more portions of the paving material mat region 204, a range of texture values and/or a range of height values. The control device 142 may determine a texture value difference between a maximum texture value and a minimum texture value of the range of texture values and/or a height value difference between a maximum height value and a minimum height value of the range of height values. The control device 142 may assign a finish value that indicates a uniform finish (e.g., a more uniform finish, a moderately uniform finish, and/or the like) of the paving material mat region 204 when the texture value difference satisfies (e.g., is less than or equal to) a texture value threshold and/or when the height value difference satisfies (e.g., is less than or equal to) a height value threshold. The control device 142 may assign a finish value that indicates a nonuniform finish of the paving material mat region 204 when the texture value difference does not satisfy (e.g., is greater than) a texture value threshold and/or when the height value difference does not satisfy (e.g., is greater than) a height value threshold.

In some implementations, the control device 142 may cause one or more actions to be performed (e.g., based on the finish value of the paving material mat region 204). For example, the control device 142 may generate a first message indicating the finish value of the paving material mat region 204 and/or a second message indicating one or more settings associated with the screed assembly 102 or the machine 100 that caused the screed assembly 102 to lay the paving material mat region 204. The control device 142 may send the first message and/or the second message to a client device to cause the first message and/or the second message to be displayed on a display of the client device. Additionally, or alternatively, the control device 142 may cause the first message and the second message to be displayed on a display of the machine 100 (e.g., that is included in the control panel 120).

In an additional example, the control device 142 may generate a report regarding a finish of the paving material mat 202. The control device 142 may generate a report entry concerning the finish value of the paving material mat region 204 and may cause the report entry to be added to the report. The control device 142 may send the report to a client device to cause the client device to display the report on a display of the client device. In another example, the control device 142 may generate a report (e.g., an "as built" report) regarding the paving material mat 202. The control device 142 may generate a report entry concerning the respective texture values of the two or more portions of the paving material mat region, the respective height values of the two or more portions of the paving material mat region 204, the finish value associated with the paving material mat region 204, and/or the like. The control device 142 may send the report to a client device (e.g., a client device associated with an organization, such as a "paving authority" organization responsible for laying, monitoring, maintaining, modifying, and/or otherwise providing quality control of the paving material mat region 204) to enable the control device to monitor, maintain, modify, and/or otherwise provide quality control of the paving material mat region 204.

As another example, the control device 142 may determine that the finish value indicates a nonuniform finish of the paving material mat region 204 and may selectively adjust one or more settings associated with the screed assembly 102 or the machine 100 (e.g., by generating and sending one or more commands to the control panel 120 to adjust the one or more settings). The one or more settings may include a setting associated with an angle of attack of at least one section of the screed assembly 102; a setting associated with a height of at least one section of the screed assembly 102; a setting associated with a paving material distribution amount of the at least one auger 134; a setting associated with a heading of the machine 100; a setting associated with a speed of the machine 100; and/or the like. Selectively adjusting the one or more settings associated with the screed assembly 102 or the machine 100 may cause the screed assembly 102 to lay an additional paving material mat region that has a different finish value (e.g., a finish value that indicates a more uniform finish of the additional paving material mat region).

In another example, the control device 142 may generate at least one message indicating the one or more instructions to adjust one or more settings associated with the screed assembly 102 or the machine 100. The control device 142 may cause the at least one message to be displayed on the display of the machine 100 (e.g., that is included in the control panel 120).

As another example, the control device 142 may determine that the finish value indicates a uniform finish of the paving material mat region 204 and may generate a message recommending that the one or more settings associated with the screed assembly 102 or the machine 100 should not to be adjusted. The control device 142 may cause the message to be displayed on the display of the machine 100 (e.g., that is included in the control panel 120).

As indicated above, FIG. 3 is provided as an example. Other examples may differ from what is described in connection with FIG. 3.

Figure 4:
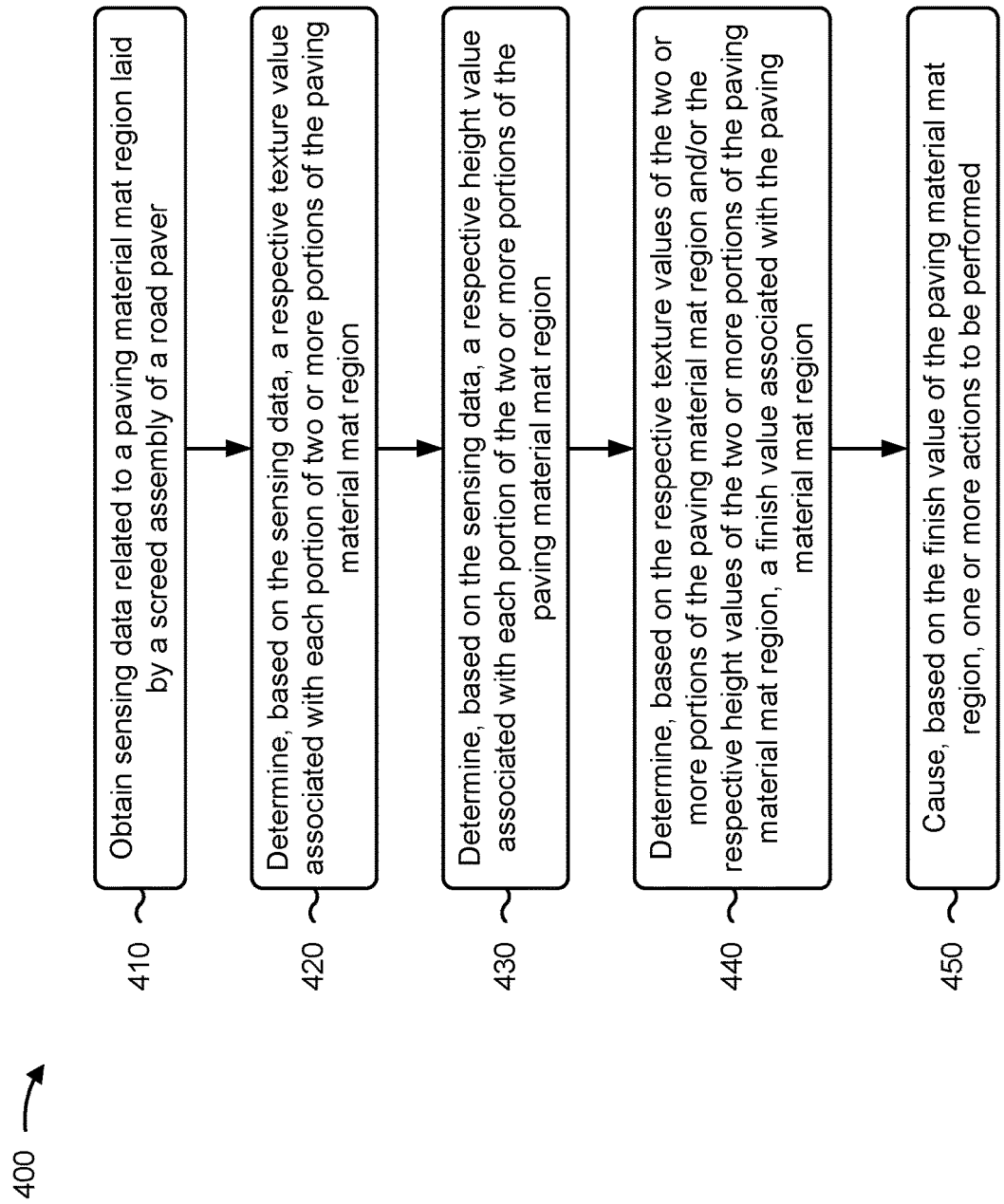
FIG. 4 is a flowchart of an example process for facilitating a screed assembly in laying a paving material mat with a uniform finish.

FIG. 4 is a flow chart of an example process 400 for facilitating a screed assembly in laying a paving material mat with a uniform finish. One or more process blocks of FIG. 4 may be performed by a control device (e.g., control device 142). In some implementations, one or more process blocks of FIG. 4 may be performed by another device or a group of devices separate from or including the control device, such as a sensing device (e.g., at least one sensing device 140), a control panel (e.g., control panel 120), and/or the like.

As shown in FIG. 4, process 400 may include obtaining sensing data related to a paving material mat region laid by a screed assembly of a road paver (block 410).

As further shown in FIG. 4, process 400 may include determining, based on the sensing data, a respective texture value associated with each portion of two or more portions of the paving material mat region (block 420).

As further shown in FIG. 4, process 400 may include determining, based on the sensing data, a respective height value associated with each portion of the two or more portions of the paving material mat region (block 430).

As further shown in FIG. 4, process 400 may include determining, based on the respective texture values of the two or more portions of the paving material mat region and/or the respective height values of the two or more portions of the paving material mat region, a finish value associated with the paving material mat region (block 440

As further shown in FIG. 4, process 400 may include causing, based on the finish value of the paving material mat region, one or more actions to be performed (block 450). For example, the control device may cause one or more settings associated with the screed assembly or the road paver to cause the screed assembly to be adjusted (e.g., to cause the screed assembly to lay an additional paving material mat region that has a different finish value). As another example, the control device may generate a first message indicating the finish value of the paving material mat region and generate a second message indicating one or more instructions to adjust the one or more settings associated with the screed assembly or the work machine. The control device may cause the first message and the second message to be displayed on a display of the road paver.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Two or more of the blocks of process 400 may be performed in parallel.

INDUSTRIAL APPLICABILITY

The disclosed control device (e.g., the control device 142) may be used to facilitate any screed assembly of a road paver to lay a paving material mat with a uniform finish. The control device is able to obtain sensing data related to a paving material mat region laid by the screed assembly and determine a respective texture value and/or a respective height value of each portion of two or more portions of the paving material mat region. The control device is thereby able to determine a finish value associated with the paving material mat region that indicates whether the paving material mat region has a uniform finish or a nonuniform finish. Accordingly, the control device may cause, based on the finish value, one or more actions to be performed, such as automatically adjusting one or more settings associated with the screed assembly.

In this way, by determining a finish value associated with the paving material mat region and automatically adjusting the one or more settings associated with the screed assembly, the control device may cause the screed assembly to lay a paving material mat with a more uniform finish than a paving material mat that is laid when a human operator is manually controlling the screed assembly. This provides a greater quality paving material mat, which reduces a likelihood that the paving material mat will need to be repaired, torn up and repaved, and/or the like. This may reduce unnecessary usage of the road paver and/or the screed assembly, which may extend a working life of the road paver and/or the screed assembly and/or reduce an amount of maintenance needed to maintain the road paver and/or the screed assembly.

What is claimed is:

1. A method, comprising:
    obtaining sensing data related to a paving material mat region laid by a screed assembly of a road paver;
    determining, based on the sensing data, a respective texture value associated with each portion of two or more portions of the paving material mat region;
    determining, based on the sensing data, a respective height value associated with each portion of the two or more portions of the paving material mat region;
    determining, based on the respective texture values of the two or more portions of the paving material mat region and the respective height values of the two or more portions of the paving material mat region, a finish value associated with the paving material mat region;
    determining that the finish value associated with the paving material mat region indicates a nonuniform finish of the paving material mat region; and
    selectively adjusting, based on determining that the finish value associated with the paving material mat region indicates a nonuniform finish of the paving material mat region, one or more settings associated with the screed assembly or the road paver to cause the screed assembly to lay an additional paving material mat region that has a finish value that indicates a uniform finish.

2. The method of claim 1, wherein obtaining the sensing data comprises:
    receiving image data concerning each portion, of the two or more portions, of the paving material mat region from at least one camera device associated with the road paver; and
    receiving distance data concerning each portion, of the two or more portions, of the paving material mat region from at least one light detection and ranging (LIDAR) device associated with the road paver.

3. The method of claim 1, wherein the sensing data comprises image data or distance data associated with the two or more portions of the paving material mat region, and
    wherein determining the respective texture value associated with each portion of two or more portions of the paving material mat region comprises:
        processing the sensing data to identify at least one subset of the sensing data that is associated with a particular portion, of the two or more portions, of the paving material mat region; and
        processing the at least one subset of the sensing data using a machine learning model to determine a texture value associated with the particular portion of the paving material mat region.

4. The method of claim 1, wherein the sensing data comprises distance data associated with the two or more portions of the paving material mat region, and
    wherein determining the respective height value associated with each portion of the two or more portions of the paving material mat region comprises:
        processing the distance data to identify at least one subset of the distance data that is associated with a particular portion, of the two or more portions, of the paving material mat region; and
        processing the at least one subset of the distance data to determine a height value associated with the particular portion of the paving material mat region.

5. The method of claim 1, wherein determining the finish value associated with the paving material mat region comprises:
    determining a difference between a respective texture value of a first portion, of the two or more portions, of the paving material mat region and a respective texture value of a second portion, of the two or more portions, of the paving material mat region;
    determining whether the difference satisfies a difference threshold; and
    determining, based on determining whether the difference satisfies the difference threshold, the finish value associated with the paving material mat region.

6. The method of claim 1, wherein determining the finish value associated with the paving material mat region comprises:
    determining a difference between a respective height value of a first portion, of the two or more portions, of the paving material mat region and a respective height value of a second portion, of the two or more portions, of the paving material mat region;
    determining whether the difference satisfies a difference threshold; and
    determining, based on determining whether the difference satisfies the difference threshold, the finish value associated with the paving material mat region.

7. The method of claim 1, wherein the one or more settings includes at least one of:
    a setting associated with an angle of attack of at least one section of the screed assembly;
    a setting associated with a height of at least one section of the screed assembly;

a setting associated with a paving material distribution amount of at least one auger associated with the screed assembly;
a setting associated with a heading of the road paver; or
a setting associated with a speed of the road paver.

8. The method of claim 1, wherein the finish value indicates whether the paving material mat region has a more uniform finish.

9. The method of claim 1, further comprising:
generating a report,
wherein the report is based on the finish value associated with the paving material mat region; and
sending the report to a client device to cause the client device to display the report on a display of the client device.

10. A control system for a screed assembly of a road paver, the control system comprising:
at least one sensing device configured to capture sensing data concerning two or more portions of a paving material mat region laid by the screed assembly of the road paver; and
a controller configured to:
obtain the sensing data from the at least one sensing device;
determine, based on the sensing data, a respective texture value of each portion of the two or more portions of the paving material mat region or a respective height value of each portion of the two or more portions of the paving material mat region;
determine, based on the respective texture values of the two or more portions of the paving material mat region or the respective height values of the two or more portions of the paving material mat region, a finish value of the paving material mat region; and
cause, based on the finish value of the paving material mat region, one or more actions to be performed;
wherein at least one of (a) or (b) are satisfied, such that
(a) the sensing data includes distance data, and
wherein the controller is configured to, when determining the respective height value of each portion of the two or more portions of the paving material mat region:
analyze the distance data to identify particular distance data, of the distance data, that is associated with a particular portion, of the two or more portions, of the paving material mat region;
identify one or more distances indicated by the particular distance data; and
determine, based on the one or more distances, a height value of the particular portion; and
(b) the controller is configured to, when determining the finish value of the paving material mat region:
determine, based on the respective texture values of the two or more portions of the paving material mat region, a range of texture values;
determine a texture value difference between a maximum texture value and a minimum texture value of the range of texture values; and
determine, based on the texture value difference, the finish value.

11. The control system of claim 10, wherein the sensing data includes image data,
wherein the controller is configured to, when determining the respective texture value of each portion of the two or more portions of the paving material mat region:
analyze the image data to identify particular image data, of the image data, that is associated with a particular portion, of the two or more portions, of the paving material mat region; and
analyze the particular image data using a statistical image processing technique to determine a texture value of the particular portion.

12. The control system of claim 10, wherein the controller is configured to, when causing the one or more actions to be performed:
determine that the finish value indicates a nonuniform finish of the paving material mat region;
automatically cause, based on determining that the finish value indicates a nonuniform finish of the paving material mat region, at least one of:
one or more settings associated with the screed assembly or the road paver to be adjusted; or
at least one message to be displayed on a display of the road paver,
wherein the at least one message indicates the one or more settings to be adjusted.

13. The control system of claim 10, wherein the controller is configured to, when causing the one or more actions to be performed:
generate a report entry concerning the finish value of the paving material mat region;
cause the report entry to be added to a report regarding a finish of the paving material mat; and
send the report to a client device to cause the client device to display the report on a display of the client device.

14. A work machine comprising:
a screed assembly configured to lay a paving material mat;
at least one sensing device configured to capture sensing data concerning two or more portions of a paving material mat region laid by the screed assembly; and
a controller configured to:
obtain the sensing data from the at least one sensing device;
determine, based on the sensing data, a respective texture value of each portion of the two or more portions of the paving material mat region or a respective height value of each portion of the two or more portions of the paving material mat region;
determine, based on the respective texture values of the two or more portions of the paving material mat region or the respective height values of the two or more portions of the paving material mat region, a finish value of the paving material mat region; and
cause, based on the finish value of the paving material mat region, one or more actions to be performed;
wherein at least one of (a) or (b) are satisfied, such that
(a) the sensing data includes distance data, and
wherein the controller is configured to, when determining the respective height value of each portion of the two or more portions of the paving material mat region:
analyze the distance data to identify particular distance data, of the distance data, that is associated with a particular portion, of the two or more portions, of the paving material mat region;
identify one or more distances indicated by the particular distance data; and
determine, based on the one or more distances, a height value of the particular portion; and
(b) the controller is configured to, when determining the finish value of the paving material mat region:

determine, based on the respective texture values of the two or more portions of the paving material mat region, a range of texture values;

determine a texture value difference between a maximum texture value and a minimum texture value of the range of texture values; and determine, based on the texture value difference, the finish value.

15. The work machine of claim 14, wherein the controller is configured to, when determining the finish value of the paving material mat region:

determine, based on the sensing data, at least two texture values associated with the paving material mat region or at least two height values associated with the paving material mat region; and determine, based on the at least two texture values associated with the paving material mat region or the at least two height values associated with the paving material mat region, the finish value of the paving material mat region.

16. The work machine of claim 14, wherein the controller is configured to, when causing the one or more actions to be performed:

selectively adjust, based on the finish value of the paving material mat region, one or more settings associated with the screed assembly or the work machine to cause the screed assembly to lay an additional paving material mat region that has a different finish value.

17. The work machine of claim 14, wherein the controller is configured to, when causing the one or more actions to be performed:

generate a first message indicating the finish value of the paving material mat region;

generate a second message indicating one or more instructions to adjust one or more settings associated with the screed assembly or the work machine to cause the screed assembly to lay an additional paving material mat region that has a different finish value; and cause the first message and the second message to be displayed on a display of the work machine.

18. The work machine of claim 14, wherein the controller is configured to, when causing the one or more actions to be performed:

determine that the finish value associated with the paving material mat region indicates a uniform finish of the paving material mat region;

generate a message recommending that one or more settings associated with the screed assembly or the work machine that caused the screed assembly to lay the paving material mat region should not be adjusted; and cause the message to be displayed on a display of the work machine.

* * * * *